(12) United States Patent
Serrette

(10) Patent No.: US 10,870,434 B1
(45) Date of Patent: Dec. 22, 2020

(54) VEHICLE INSPECTION SYSTEM

(71) Applicant: Uriah Serrette, Lake Charles, LA (US)

(72) Inventor: Uriah Serrette, Lake Charles, LA (US)

( * ) Notice: Subject to any disclaimer, the term of this patent is extended or adjusted under 35 U.S.C. 154(b) by 0 days.

(21) Appl. No.: 16/525,645

(22) Filed: Jul. 30, 2019

(51) Int. Cl.
B60L 1/00 (2006.01)
B60L 3/00 (2019.01)
B60W 50/00 (2006.01)
B60W 50/12 (2012.01)
B60K 28/00 (2006.01)

(52) U.S. Cl.
CPC ..... *B60W 50/0098* (2013.01); *B60K 2028/003* (2013.01); *B60W 50/12* (2013.01)

(58) Field of Classification Search
CPC ............ B60K 2028/003; B60K 28/003; B60K 28/00; B60W 50/0098; B60W 50/12
See application file for complete search history.

(56) References Cited

U.S. PATENT DOCUMENTS

| D242,722 S | 12/1976 | Bell | |
|---|---|---|---|
| 4,479,064 A * | 10/1984 | Monsen | B60R 25/045 290/37 R |
| 6,116,201 A | 9/2000 | Labelle | |
| 6,587,768 B2 | 7/2003 | Chene | |
| 6,804,626 B2 | 10/2004 | Manegold | |
| 6,834,259 B1 | 12/2004 | Markwitz | |
| 7,176,787 B2 | 2/2007 | Herrera | |
| 7,808,369 B2 | 10/2010 | Brinton | |
| 2002/0140293 A1* | 10/2002 | Rothleitner | H02J 9/061 307/64 |
| 2008/0223645 A1* | 9/2008 | Shaw | B60R 25/209 180/270 |
| 2010/0285679 A1* | 11/2010 | Miller | H01R 13/5221 439/139 |
| 2014/0067189 A1* | 3/2014 | Smith | G08G 1/166 701/29.1 |

* cited by examiner

*Primary Examiner* — Rexford N Barnie
*Assistant Examiner* — Rasem Mourad

(57) ABSTRACT

The vehicle inspection system is a safety device. The vehicle inspection system is an ignition disablement system. The vehicle inspection system comprises a vehicle and a cut-out circuit. The vehicle further comprises a vehicle electric system. The vehicle electric system further comprises a positive terminal and a negative terminal. The cut-out circuit and the vehicle electric system are electrically interconnected. The cut-out circuit disables the ignition of the vehicle until a visual inspection of vehicle is completed. The cut-out circuit mounts in the vehicle. The cut-out circuit is distributed through the vehicle such that an operator of the vehicle cannot simultaneously reach the enablement mechanism and the ignition mechanism of the vehicle. This distribution of the cut-out circuit requires an operator to walk around the vehicle allowing for a visual inspection of the vehicle before the ignition can be enabled.

13 Claims, 6 Drawing Sheets

VEHICLE INSPECTION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, a device that prevents vehicle ignition in unsafe conditions by inhibiting the starter motor. (B60K28/003)

SUMMARY OF INVENTION

The vehicle inspection system is a safety device. The vehicle inspection system is an ignition disablement system. The vehicle inspection system comprises a vehicle and a cut-out circuit. The vehicle further comprises a vehicle electric system. The vehicle electric system further comprises a positive terminal and a negative terminal. The cut-out circuit and the vehicle electric system are electrically interconnected. The cut-out circuit disables the ignition of the vehicle until a visual inspection of the vehicle is completed. The cut-out circuit mounts in the vehicle. The cut-out circuit is distributed through the vehicle such that an operator of the vehicle cannot simultaneously reach the enablement mechanism and the ignition mechanism of the vehicle. This distribution of the cut-out circuit requires an operator to walk around the vehicle allowing for a visual inspection of the vehicle before the ignition can be enabled.

These together with additional objects, features and advantages of the vehicle inspection system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle inspection system in detail, it is to be understood that the vehicle inspection system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle inspection system.

It is therefore important that the claims be regarded as including such equivalent construction insofar as they do not depart from the spirit and scope of the vehicle inspection system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
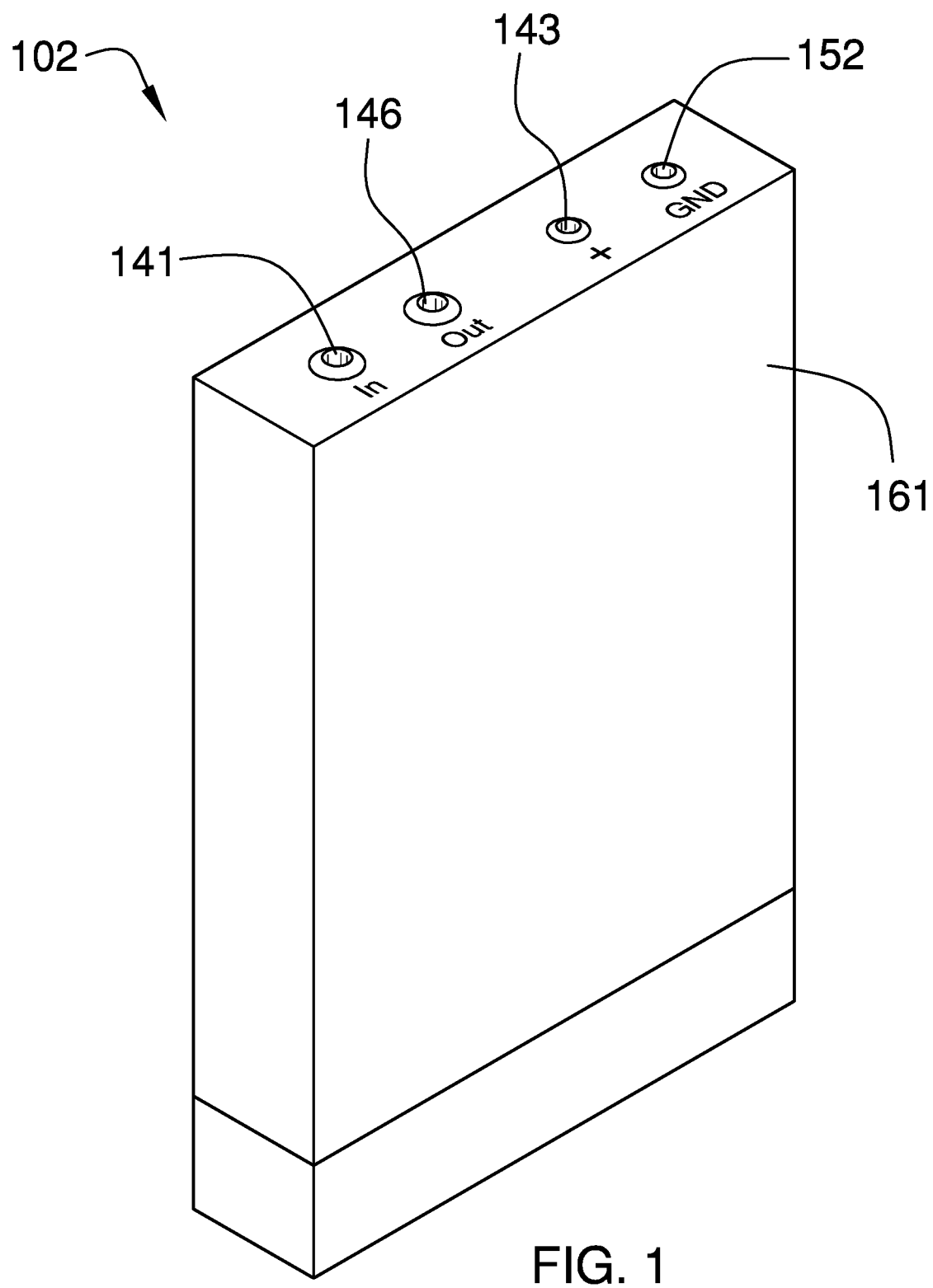
FIG. 1 is a perspective view of an embodiment of the disclosure.
Figure 2:
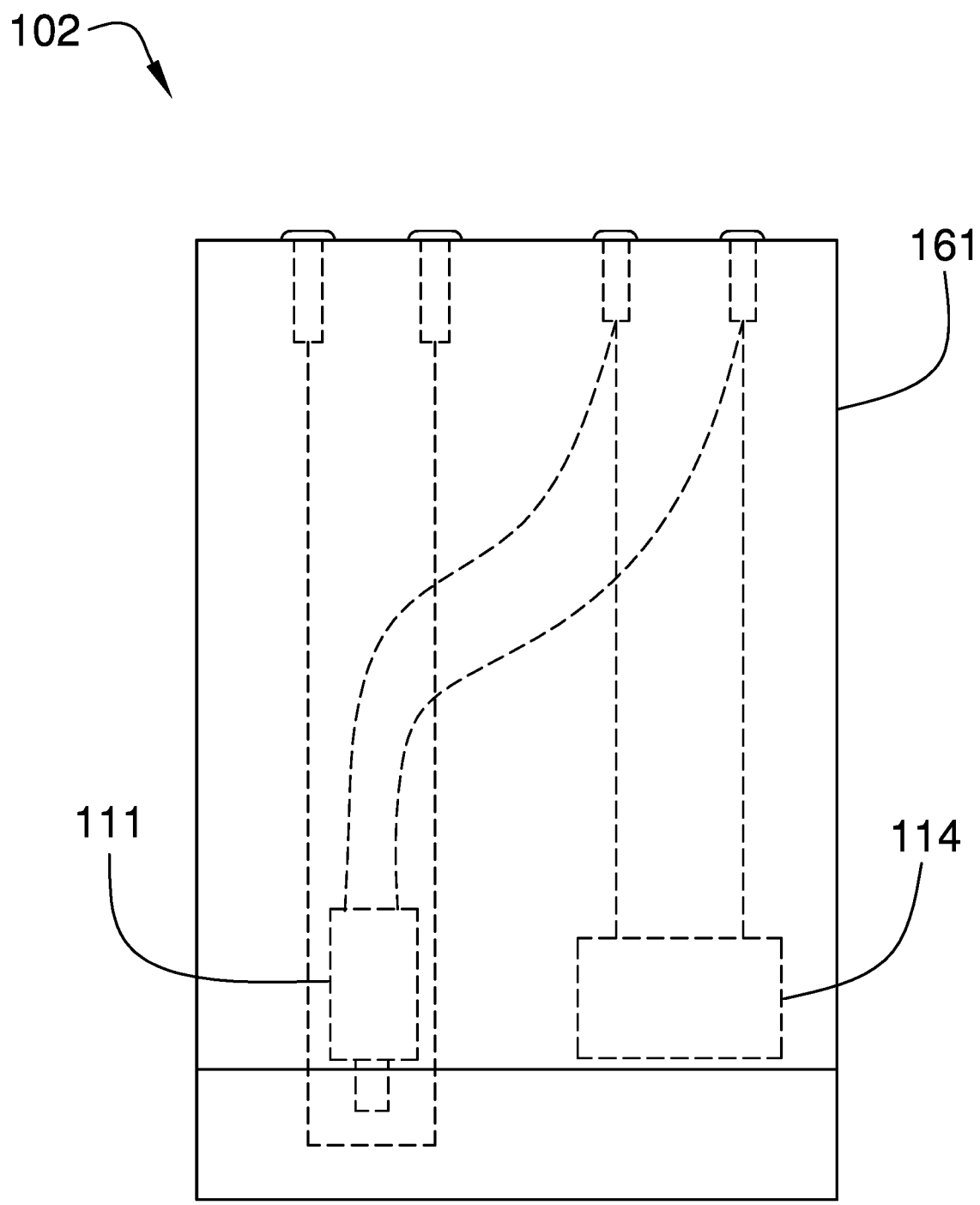
FIG. 2 is a front view of an embodiment of the disclosure.
Figure 3:
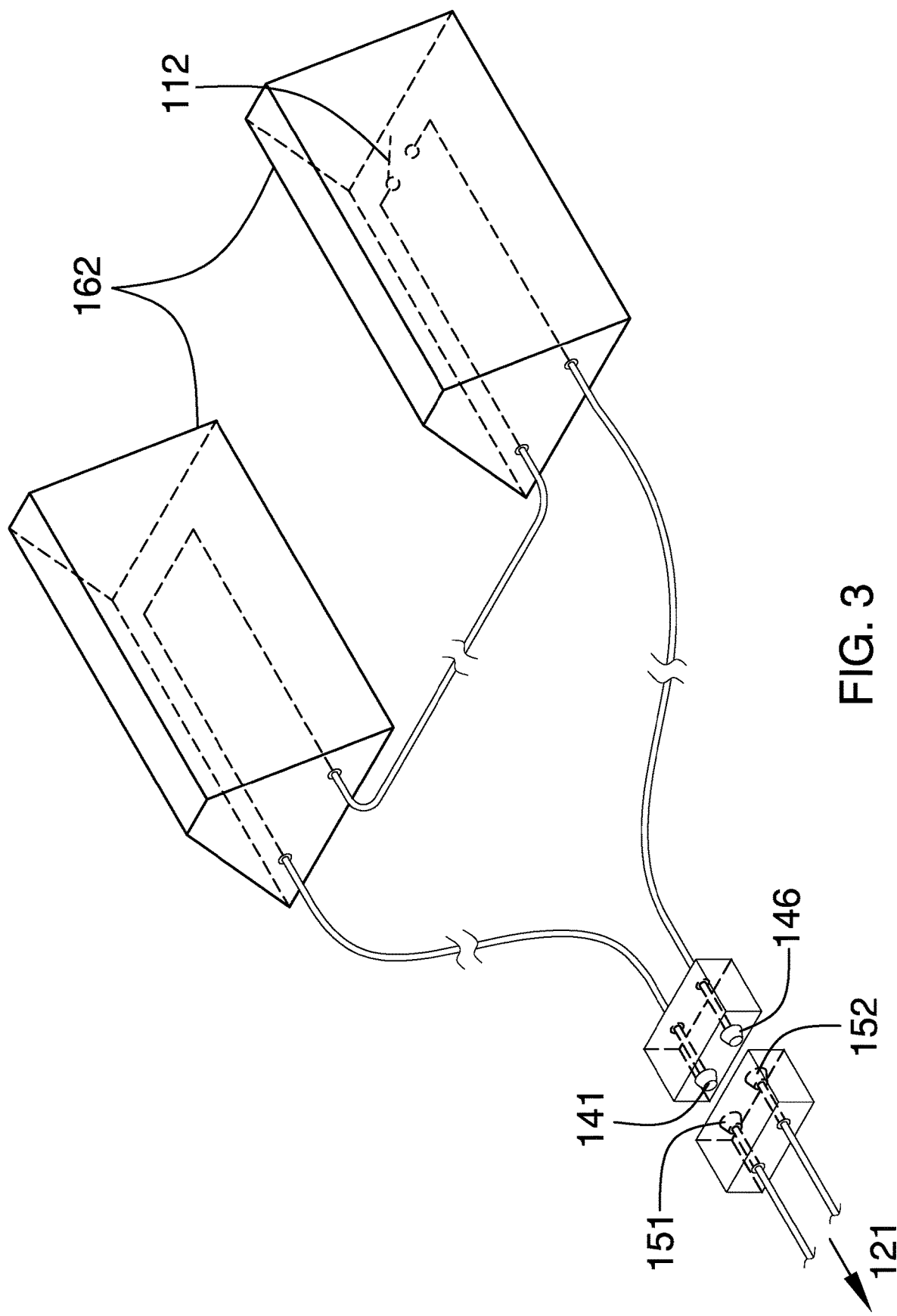
FIG. 3 is a perspective view of an alternate embodiment of the disclosure.
Figure 4:
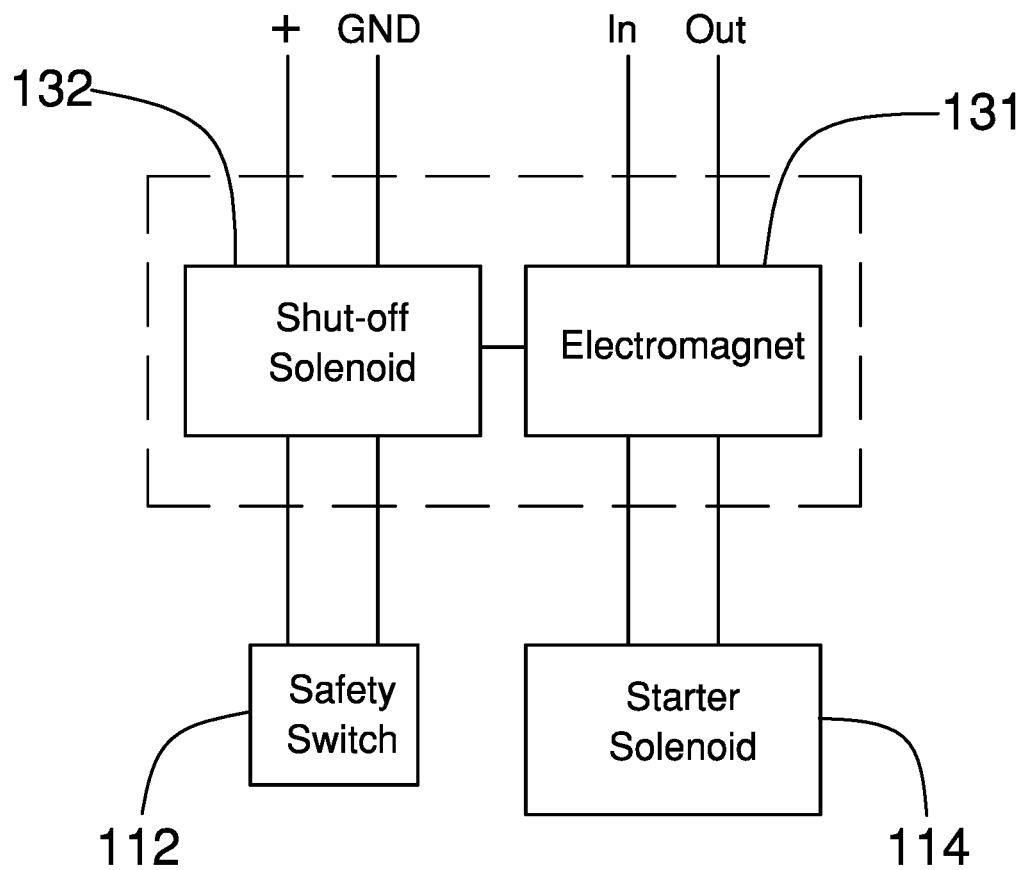
FIG. 4 is a block diagram of an embodiment of the disclosure.
Figure 5:
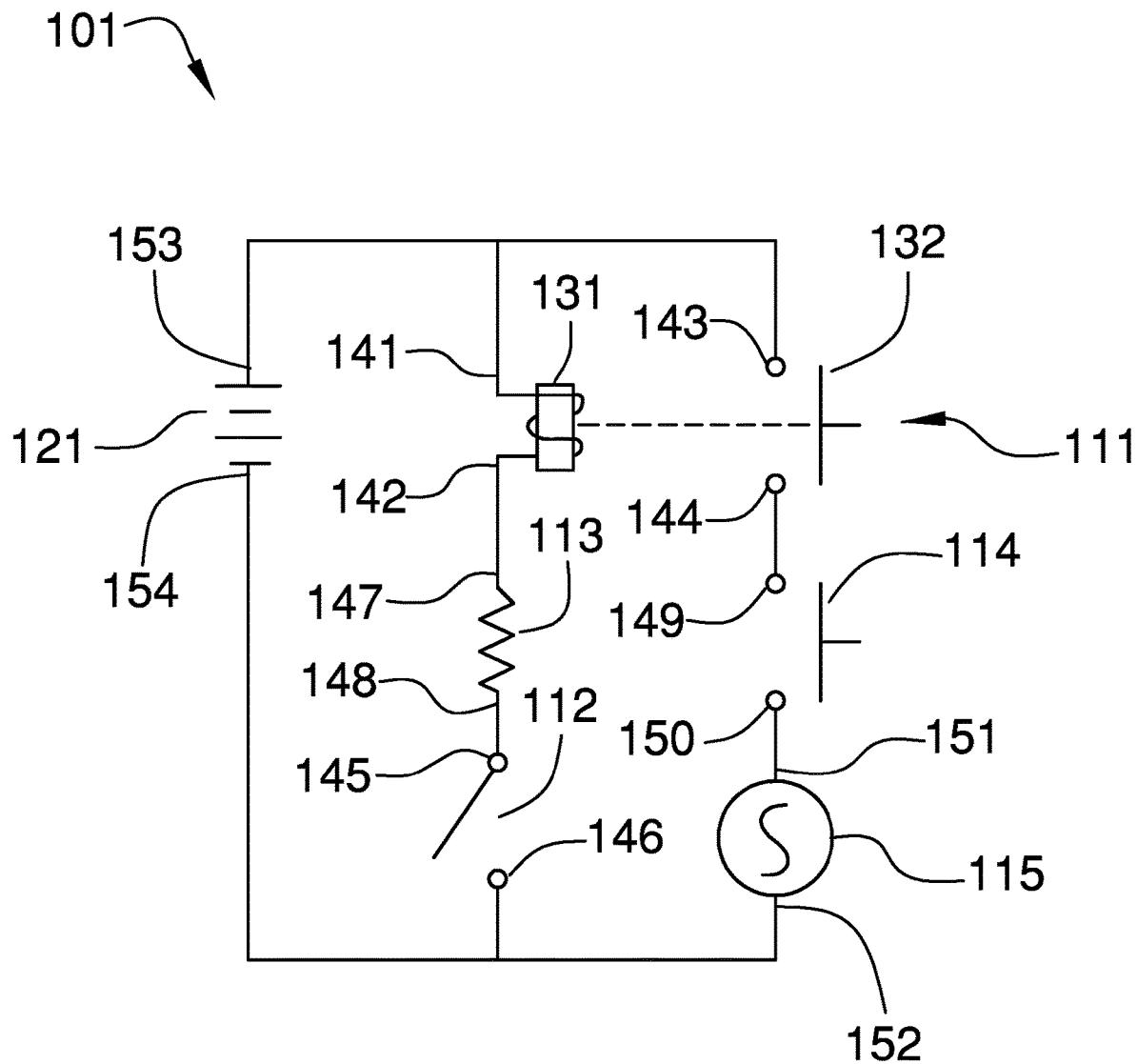
FIG. 5 is a schematic view of an embodiment of the disclosure.
Figure 6:
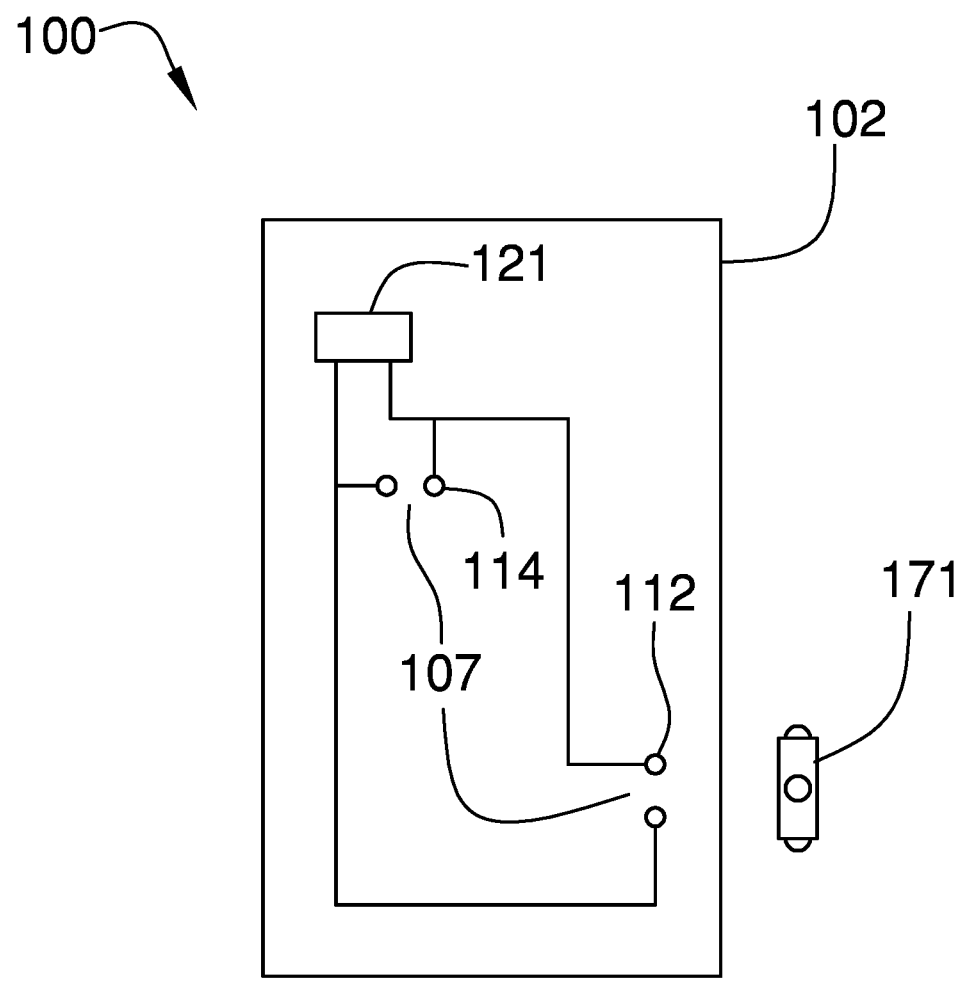
FIG. 6 is an in-use view of an embodiment of the disclosure.

Detailed reference will now be made to one or more potential embodiments of the disclosure, which are illustrated in FIGS. 1 through 6.

The vehicle inspection system 100 (hereinafter invention) is a safety device. The invention 100 is an ignition disablement system. The invention 100 comprises a vehicle 102 and a cut-out circuit 101. The vehicle 102 further comprises a vehicle 102 electric system 121. The vehicle 102 electric system 121 further comprises a positive terminal 153 and a negative terminal 154. The cut-out circuit 101 and the vehicle 102 electric system 121 are electrically interconnected. The cut-out circuit 101 disables the operation of the vehicle 102 until a visual inspection of vehicle 102 is completed. The cut-out circuit 101 mounts in the vehicle 102. The cut-out circuit 101 is distributed through the vehicle 102 such that an operator 171 of the vehicle 102 cannot simultaneously reach the enablement mechanism and the starting mechanism of the vehicle 102. This distribution of the cut-out circuit 101 requires an operator 171 to walk around the vehicle 102 thereby forcing a visual inspection of the vehicle 102 before the vehicle 102 can be operated.

The vehicle 102 is defined in greater detail elsewhere in this disclosure. The vehicle 102 electric system 121 is a source of electrical energy provisioned with the vehicle 102. The use of a vehicle 102 electric system 121 is well-known and documented in the transportation arts. The vehicle 102 electric system 121 is further defined with a positive terminal 153 and a negative terminal 154.

The cut-out circuit 101 is an electrical switching circuit. The cut-out circuit 101 enables and disables the operation of the vehicle 102. The cut-out circuit 101 controls the ability to operate the ignition of the vehicle 102. The cut-out circuit 101 is distributed through the vehicle 102 such that an operator 171 cannot initiate the operating the vehicle 102 without activating the ignition switch 114 at a location that is beyond the reach of the operator 171 from the ignition switch 114. The distribution of the cut-out circuit 101 within the vehicle 102 forces the operator 171 to walk around the vehicle 102 before starting the vehicle 102 such that the operator 171 has the opportunity to inspect the vehicle 102.

The cut-out circuit 101 comprises an enabling relay 111, an enabling switch 112, a pull-down resistor 113, and an ignition switch 114. The enabling switch 112 is further defined with a fifth lead 145 and a sixth lead 146. The pull-down resistor 113 is further defined with a seventh lead 147 and an eighth lead 148. The ignition switch 114 is further defined with a ninth lead 149 and a tenth lead 150. The starter motor 115 is further defined with an eleventh lead 151 and a twelfth lead 152.

The enabling relay 111 is an electrical device. The enabling relay 111 is a switching element of the cut-out circuit 101. The enabling relay 111 is a commercially available relay. The enabling relay 111 is a normally open relay. The enabling relay 111 controls the flow of electricity from the vehicle 102 electric system 121 into the ignition switch 114 of the cut-out circuit 101. The enabling relay 111 maintains the vehicle 102 in a disabled state until the enabling switch 112 has been actuated. The enabling relay 111 enables the operation of the ignition switch 114 when the enabling switch 112 has been actuated. The enabling relay 111 further comprises a relay coil 131 and a relay switch 132. The relay coil 131 is further defined with a first lead 141 and a second lead 142. The relay switch 132 is further defined with a third lead 143, and a fourth lead 144.

The relay coil 131 is a solenoid. The relay coil 131 controls the operation of the relay switch 132. The relay coil 131 is an electromechanical device that opens and closes the relay switch 132. The relay coil 131 holds the relay switch 132 in a closed position when the relay coil 131 is energized.

The relay switch 132 is open when the relay coil 131 is deenegerized. The relay switch 132 forms the switching element of the enabling relay 111. The relay switch 132 controls the flow of electricity into the ignition switch 114. The operation of the relay switch 132 is controlled by the relay coil 131. The relay switch 132 is a normally open switch.

The enabling switch 112 is a maintained switch. The enabling switch 112 is a switching element of the cut-out circuit 101. The enabling switch 112 controls the flow of electricity through the relay coil 131 of the enabling relay 111. The position of the enabling switch 112 relative to the ignition switch 114 is selected such that the operator 171 cannot simultaneously actuate both the enabling switch 112 and the ignition switch 114. The relay coil 131 is energized when the enabling switch 112 is in a closed position and is deenegerized when the enabling switch 112 is in an open position. The enabling switch 112 is wired in series with the relay coil 131 and the pull-down resistor 113.

The pull-down resistor 113 is a circuit element. The pull-down resistor 113 is wired in series with the relay coil 131 and the enabling switch 112. The pull-down resistor 113 presents a voltage to the relay coil 131 of the enabling relay 111 such that the relay coil 131 can be energized. The pull-down resistor 113 limits the flow of electricity through both relay coil 131 and the enabling switch 112.

The ignition switch 114 is a momentary switch. The ignition switch 114 is a normally open switch. The ignition switch 114 is a switching element of the cut-out circuit 101. The ignition switch 114 controls the flow of electricity into the starter motor 115 from the relay switch 132 of the enabling relay 111. The ignition switch 114 is wired in series with the relay switch and the starter motor 115. The use of the ignition switch 114 is enabled when the relay coil 131 is energized and the relay switch 132 is closed. The use of the ignition switch 114 is well-known and documented in the transportation arts.

The starter motor 115 is an electric motor. The starter motor 115 provides the rotational energy required to initiate the operation of the vehicle 102. The starter motor 115 rotates when the ignition switch 114 and the relay switch 132 are simultaneously in the closed position. The starter motor 115 is wired in series with the relay switch 132 and the ignition switch 114.

In the first potential embodiment of the disclosure, the invention 100 further comprises a housing 161. The housing 161 is a rigid casing. The housing 161 contains the enabling relay 111 and the pull-down resistor 113. The housing 161 is formed with all apertures and form factors necessary to allow the housing 161 to accommodate the use, the operation, and the external connections of the enabling relay 111 and the pull-down resistor 113. The housing 161 mounts within the vehicle 102. Methods to form a housing 161 suitable for the purposes described in this disclosure are well-known and documented in the mechanical arts.

In a second potential embodiment of the disclosure, the invention 100 further comprises a plurality of chocks 162. The plurality of chocks 162 comprises a plurality of structures that inhibit the vehicle 102 from moving. In the second potential embodiment of the disclosure, the plurality of chocks 162 contain the enabling switch 112. The use of the plurality of chocks 162 requires the operator 171 to initiate the operation of the vehicle 102 before removing and disconnecting the enabling switch 112 from the cut-out circuit 101 as a part of removing the plurality of chocks 162.

The following three paragraphs describe the assembly of the cut-out circuit 101.

The positive terminal 153 of the vehicle 102 electric system 121 electrically connects to the first lead 141 of the relay coil 131 of the enabling relay 111. The positive terminal 153 of the vehicle 102 electric system 121 electrically connects to the third lead 143 of the relay switch 132 of the enabling relay 111.

The second lead 142 of the relay coil 131 of the enabling relay 111 electrically connects to the seventh lead 147 of the pull-down resistor 113. The eighth lead 148 of the pull-down resistor 113 electrically connects to the fifth lead 145 of the enabling switch 112. The sixth lead 146 of the enabling switch 112 electrically connects to the negative terminal 154 of the vehicle 102 electric system 121.

The fourth lead 144 of the relay switch 132 of the enabling relay 111 electrically connects to the ninth lead 149 of the ignition switch 114. The tenth lead 150 of the ignition switch 114 electrically connects to the eleventh lead 151 of the starter motor 115. The twelfth lead 152 of the starter motor 115 electrically connects to the negative terminal 154 of the vehicle 102 electric system 121.

The following definitions were used in this disclosure:

Battery: As used in this disclosure, a battery is a chemical device consisting of one or more cells, in which chemical energy is converted into electricity and used as a source of power. Batteries are commonly defined with a positive terminal and a negative terminal.

Chock: As used in this disclosure, a chock is a block or a wedge that is placed under an object to prevent the object from moving.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Form Factor: As used in this disclosure, the term form factor refers to the size and shape of an object.

Housing: As used in this disclosure, a housing is a rigid casing that encloses and protects one or more devices.

Lead: As used in this disclosure, a lead is a conductor that is physically used to electrically connect an electrical component into a larger circuit assembly.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Motor: As used in this disclosure, a motor refers to the method of transferring energy from an external power source into rotational mechanical energy.

Normally Closed: As used in this disclosure, normally closed refers to an externally controlled electrical switching device, such as a relay or a momentary switch, which passes electric current when the externally controlled electrical switching device is in an unpowered state.

Normally Open: As used in this disclosure, normally open refers to an externally controlled electrical switching device, such as a relay or a momentary switch, which does not pass electric current when the externally controlled electrical switching device is in an unpowered state.

Operator: As used in this disclosure, an operator is an individual who is designated to use or operate the disclosure at bar.

Pull-Down Resistor: As used in this disclosure, a pull-down resistor is an electrical resistor that is used within a switching circuit or logic circuit to present a predetermined signal voltage to a logic element or switching element.

Reach: As used in this disclosure, reach refers to a span of distance between any two objects.

Relay: As used in this disclosure, a relay is an automatic electromagnetic or electromechanical device that reacts to changes in voltage or current by opening or closing a switch in an electric circuit. Relays further defined with a coil and a switch. Applying a voltage to the coil, usually referred to as energizing the coil, will cause the coil to change the position of the switch.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Solenoid: As used in this disclosure, a solenoid is a cylindrical coil of electrical wire that generates a magnetic field that can be used to mechanically move a shaft made of a magnetic core.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Switching Circuit: As used in this disclosure, a switching circuit is non-programmable electrical device that receives one or more digital or analog inputs and uses those digital or analog inputs to generate one or more digital or analog outputs.

Switching Element: This is a device that closes and opens an electrical circuit in response to an electrical control signal. Examples of switching elements include, but are not limited to, relays and transistors.

Vehicle: As used in this disclosure, a vehicle is a motorized device used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A safety device comprising:
a vehicle and a cut-out circuit;
wherein the vehicle further comprises a vehicle electric system;
wherein the vehicle electric system further comprises a positive terminal and a negative terminal;
wherein the cut-out circuit and the vehicle electric system are electrically interconnected;
wherein the vehicle is adapted for use by an operator;
wherein the cut-out circuit disables the operation of the vehicle;

wherein the cut-out circuit mounts in the vehicle;

wherein the distribution of the cut-out circuit requires an operator to walk around the vehicle thereby forcing a visual inspection of the vehicle before the vehicle operates;

wherein the cut-out circuit is an electrical switching circuit;

wherein the cut-out circuit enables and disables the operation of the vehicle;

wherein the cut-out circuit comprises an enabling relay, an enabling switch, a pull-down resistor, and an ignition switch;

wherein the enabling relay, the enabling switch, the pull-down resistor, and the ignition switch are electrically interconnected;

wherein the enabling switch is further defined with a fifth lead and a sixth lead;

wherein the pull-down resistor is further defined with a seventh lead and an eighth lead;

wherein the ignition switch is further defined with a ninth lead and a tenth lead;

wherein a starter motor is further defined with an eleventh lead and a twelfth lead;

wherein the enabling relay is a switching element of the cut-out circuit;

wherein the enabling relay is a normally open relay;

wherein the enabling relay controls the flow of electricity from the vehicle electric system into the ignition switch of the cut-out circuit;

wherein the enabling relay maintains the vehicle in a disabled state until the enabling switch is actuated;

wherein the enabling relay enables the operation of the ignition switch when the enabling switch is actuated;

wherein the enabling switch is a switching element of the cut-out circuit;

wherein the enabling switch is a maintained switch;

wherein the enabling switch controls the flow of electricity through a relay coil of the enabling relay;

wherein the enabling switch is wired in series with the relay coil and the pull-down resistor.

2. The safety device according to claim 1 wherein the position of the enabling switch relative to the ignition switch is selected such that the operator cannot simultaneously actuate both the enabling switch and the ignition switch.

3. The safety device according to claim 2 wherein the pull-down resistor is a circuit element;

wherein the pull-down resistor presents a voltage to the relay coil of the enabling relay such that the relay coil is energized;

wherein the pull-down resistor limits the flow of electricity through both relay coil and the enabling switch.

4. The safety device according to claim 3 wherein the ignition switch is a switching element of the cut-out circuit;

wherein the ignition switch is a momentary switch;

wherein the ignition switch is a normally open switch;

wherein the ignition switch controls the flow of electricity into the starter motor from a relay switch of the enabling relay.

5. The safety device according to claim 4 wherein the ignition switch is wired in series with the relay switch and the starter motor;

wherein the ignition switch is enabled when the relay coil is energized and the relay switch is closed.

6. The safety device according to claim 5 wherein the starter motor is an electric motor;

wherein the starter motor provides the rotational energy required to initiate the operation of the vehicle;

wherein the starter motor rotates when the ignition switch and the relay switch are simultaneously in the closed position.

7. The safety device according to claim 6 wherein the enabling relay further comprises the relay coil and the relay switch;

wherein the relay coil controls the operation of the relay switch;

wherein the relay coil is further defined with a first lead and a second lead;

wherein the relay switch is further defined with a third lead, and a fourth lead.

8. The safety device according to claim 7 wherein the relay coil is a solenoid;

wherein the relay coil is an electromechanical device that opens and closes the relay switch;

wherein the relay coil is energized when the enabling switch is in a closed position and is deenegerized when the enabling switch is in an open position.

9. The safety device according to claim 8 wherein the relay switch forms the switching element of the enabling relay;

wherein the relay switch controls the flow of electricity into the ignition switch;

wherein the relay switch is a normally open switch.

10. The safety device according to claim 9 wherein the relay coil holds the relay switch in a closed position when the relay coil is energized.

11. The safety device according to claim 10 wherein the positive terminal of the vehicle electric system electrically connects to the first lead of the relay coil of the enabling relay;

wherein the positive terminal of the vehicle electric system electrically connects to the third lead of the relay switch of the enabling relay;

wherein the second lead of the relay coil of the enabling relay electrically connects to the seventh lead of the pull-down resistor;

wherein the eighth lead of the pull-down resistor electrically connects to the fifth lead of the enabling switch;

wherein the sixth lead of the enabling switch electrically connects to the negative terminal of the vehicle electric system;

wherein the fourth lead of the relay switch of the enabling relay electrically connects to the ninth lead of the ignition switch;

wherein the tenth lead of the ignition switch electrically connects to the eleventh lead of the starter motor;

wherein the twelfth lead of the starter motor electrically connects to the negative terminal of the vehicle electric system.

12. The safety device according to claim 10 wherein the safety device further comprises a housing;

wherein the housing is a rigid casing;

wherein the housing contains the enabling relay and the pull-down resistor;

wherein the housing mounts within the vehicle;

wherein the safety device further comprises a plurality of chocks;

wherein the plurality of chocks comprises a plurality of structures that inhibit the vehicle from moving;

wherein the plurality of chocks contain the enabling switch.

13. The safety device according to claim 12
wherein the positive terminal of the vehicle electric system electrically connects to the first lead of the relay coil of the enabling relay;
wherein the positive terminal of the vehicle electric system electrically connects to the third lead of the relay switch of the enabling relay;
wherein the second lead of the relay coil of the enabling relay electrically connects to the seventh lead of the pull-down resistor;
wherein the eighth lead of the pull-down resistor electrically connects to the fifth lead of the enabling switch;
wherein the sixth lead of the enabling switch electrically connects to the negative terminal of the vehicle electric system;
wherein the fourth lead of the relay switch of the enabling relay electrically connects to the ninth lead of the ignition switch;
wherein the tenth lead of the ignition switch electrically connects to the eleventh lead of the starter motor;
wherein the twelfth lead of the starter motor electrically connects to the negative terminal of the vehicle electric system.

\* \* \* \* \*